Reissued May 24, 1938

Re. 20,739

UNITED STATES PATENT OFFICE 20,739

MANUFACTURE OF ETHYL ALCOHOL

Floyd J. Metzger, New York, N. Y., assignor to Air Reduction Company, Incorporated, New York, N. Y., a corporation of New York No Drawing. Original No. 2,050,445, dated August 11, 1936, Serial No. 726,071, May 17, 1934. Application for reissue March 17, 1938, Serial No. 196,574. In the Netherlands June 20, 1932

11 Claims. (Cl. 260—156)

This invention relates to the production of ethyl alcohol from ethylene, and more particularly a continuous process in which a mixture of ethylene and steam in regulated proportions are passed into contact with aqueous phosphoric acid as a catalyst at a regulated high temperature and pressure.

According to the process of the present invention, ethyl alcohol is produced continuously by passing the ethylene, in admixture with suitable proportions of steam, into intimate contact with aqueous phosphoric acid as a catalyst, while maintaining the catalyst at a high temperature and maintaining the gases under a high pressure, with resulting conversion of the ethylene into alcohol, which is subsequently condensed along with the excess steam from the escaping gases.

I have found that ethyl alcohol can readily be produced in a continuous manner by passing a mixture of ethylene and steam, in suitable proportions, into intimate contact with aqueous phosphoric acid at a regulated high temperature and pressure, with resulting formation of a gaseous mixture containing the alcohol together with the excess of ethylene and steam, from which the alcohol and steam can be readily condensed.

This conversion of ethylene into ethyl alcohol can advantageously be carried out in a cyclic manner by maintaining a circulating stream of ethylene under a high pressure, admixing therewith steam in suitable proportions, passing the resulting mixture through or into contact with the aqueous phosphoric acid catalyst at a high temperature, condensing the alcohol and excess steam while maintaining the high pressure, and recycling the ethylene with suitable further additions of ethylene and steam in the further carrying out of the process.

It has been proposed to use phosphoric acid deposited on charcoal as a catalyst for the production of ethyl alcohol from ethylene and steam at temperatures between 400 and 500° C.; (752 to 932° F.) but the use of such high temperatures is open to serious objection and difficulty. As distinguished from the use of such high temperatures, the process of the present invention makes use of aqueous phosphoric acid at far lower temperatures, not materially exceeding about 300° C.; at which aqueous phosphoric acid can exist and be maintained as such under the conditions of temperature, pressure and ratio of steam to ethylene maintained during the carrying out of this process.

As compared with sulfuric acid as a catalyst for the production of ethyl alcohol from ethylene and steam, phosphoric acid appears to be somewhat less active at lower temperatures, and, in general, to be more advantageously used at higher temperatures, or temperatures in the higher portion of the range in which sulfuric acid is effective; and phosphoric acid can also be used in somewhat greater concentration than sulfuric acid without difficulties such as arise from the use of sulfuric acid due to decomposition or reduction and the formation of sulfur dioxide, etc. Phosphoric acid does not appear to have any such oxidizing action as does sulfuric acid.

The phosphoric acid employed in the present process may have a strength, for example, of from 15 to 70% of phosphoric acid, or somewhat greater strength, provided the phosphoric acid is maintained as aqueous phosphoric acid in the carrying out of the process. Aqueous phosphoric acid can under proper conditions be used of up to 80 or 85% or higher. Apparently the ethylene combines to some extent with the acid to form an ethyl phosphate so that the catalyst is a mixture of phosphoric acid and an ethyl phosphate.

The strength of the aqueous phosphoric acid catalyst is maintained substantially constant at the high temperatures and pressures employed by using regulated proportions of ethylene and steam in the gaseous mixture passed through or into contact with the acid catalyst.

The temperatures employed in the present process will vary with the strength of the acid catalyst, the pressure and the ratio of steam to ethylene employed, but in general the temperatures are much higher than it is possible to employ with the same strengths of aqueous phosphoric acid at atmospheric pressure. By passing the mixture of steam and ethylene in contact with the aqueous phosphoric acid catalyst under a high pressure, it is possible to use a much higher temperature without increasing the concentration of the aqueous phosphoric acid, and even with a much more dilute acid, as compared with operations at atmospheric pressure. Using an aqueous phosphoric acid catalyst, without promoters, and with mixtures of steam and ethylene, the temperatures are in general in excess of about 170° C. and for best results a temperature considerably in excess of 200° is advantageous, e. g. around 250 to 300° C. The temperature, however, cannot be varied independently of the other conditions because the temperature, pressure, acid strength and ratio of steam and ethylene are interdependent. With the same acid strength and the same ratio of steam and ethylene, the temperature can be very considerably increased by carrying out the process under a high pressure, and the increased temperature seems to have the effect of greatly increasing the activity of the acid catalyst and promoting the formation of alcohol.

The pressures employed in the present process are in general in excess of 100 pounds, and much higher pressures are more advantageous, such as pressures above 200 pounds, and more particularly pressures around 600 pounds or higher. With the higher pressures, for example, around 600 pounds, or even much higher pressures, around 1000 pounds or 2000 pounds pressure, there should be a proper correlation of the strength of the aqueous phosphoric acid catalyst, the temperature and the proportion of steam and ethylene. With such high pressures it is possible to use temperatures much higher than it is possible to use at atmospheric pressure with an aqueous phosphoric acid catalyst and at the same time to maintain a much lower strength of the aqueous phosphoric acid catalyst. The combined use of a high temperature and pressure with a relatively dilute aqueous phosphoric acid catalyst makes it possible to produce ethyl alcohol in commercial quantities without the objectionable decomposition which would take place at higher temperatures.

The proportions of steam and ethylene can be varied, but in general for the production of alcohol free or relatively free from ether, it is advantageous to use a sufficient proportion of steam, such as an excess of steam over the ethylene, for example, the ratio of one and one-half parts of steam to one of ethylene or of two of steam to one of ethylene, or even a higher ratio of steam to ethylene.

It is possible to produce ether as well as alcohol, where that is desired, by using a lower ratio of steam to ethylene or a stronger acid or a lower pressure; but in general the strength of the aqueous phosphoric acid catalyst will depend upon the ratio of steam to ethylene and the conditions of temperature and pressure employed, and the temperatures are such that, under the pressures and with the proportion of steam to ethylene, the prosphoric acid is maintained as aqueous phosphoric acid in the carrying out of the process. When a constant mixture of steam and ethylene is passed through or in intimate contact with the aqueous phosphoric acid catalyst under a high temperature and pressure, the strength of the acid catalyst will reach an equilibrium and will thereafter remain at the equilibrium strength as long as the conditions of the process, i. e. the temperature, pressure and ratio of steam to ethylene remain constant; but the equilibrium reached will represent a much more dilute acid than that which would represent the equilibrium at the same temperature and at atmospheric pressure, and with the same proportion of steam and ethylene.

The ethylene employed in the process may be obtained from any suitable source, such as by liquefaction and rectification of the gases produced from oil or gas cracking operations. Pure or relatively pure ethylene can readily be produced and when produced or available can be used in the process. Instead of using the pure ethylene, the impure hydrocarbon can be used admixed with other gases or vapors which are not objectionable in the process, such as saturated hydrocarbon vapors, which are not changed during the process, or other inert gases or vapors.

Where the ethylene employed in the process is impure it will be evident that the extent to which it can be recycled, when the process is carried out with recycling, will be limited by the building up of impurities or of inert gases or vapors or by the formation of undesirable reaction products, in which case the gas after one or more passages through the converter should not be further cycled or should be purified or a constant discharge of the recycling gases should be effected to maintain the recycling gases of sufficient purity.

The steam employed in the process can be supplied from any suitable source, such as a high pressure steam boiler, and admixed with the ethylene in regulated proportions. The mixture of steam and ethylene can also be prepared by passing the ethylene through a body of water maintained at a sufficiently high temperature and under the same pressure employed in the converter. In this case the recirculating ethylene can be passed through such a boiler containing water and the temperature of the boiler maintained to give the proper proportion of steam and ethylene in the gases passing therefrom to the converter.

Instead of carrying out the process in a cyclic manner, by passing the mixture of steam and ethylene through a single converter, then through a condenser, and then recirculating the ethylene with admixture of steam under the same high pressure to the same converter, two or more converters can be employed in series with or without condensation of the alcohol and steam from the gases escaping from the first converter, then admixing additional steam or ethylene or both if desired, and passing the gases through the second converter, etc.; and in such case the condensers as well as the coverters are advantageously maintained under a high pressure so that condensation as well as conversion may take place under such pressure.

The use of a series of converters makes possible the maintenance of different strengths of acid catalyst and of different temperature and pressure conditions in the different converters, thereby making it possible for example to produce ethyl alcohol free or relatively free from ether in one converter and a mixture of alcohol and ether in another converter where this is desired.

In referring to the aqueous phosphoric acid catalyst I use the term to include the acid catalyst with whatever other constituents, such as alkyl phosphate, it may contain during the catalytic conversion. Provision should be made for insuring intimate contact of the gases with the acid catalyst, such as the dissemination or distribution of the gases through the acid catalyst. Where the converter contains a considerable body of acid, the distribution of the gas and the intimate contact of the gas and acid can be promoted by suitable filling material which impedes the upward flow of the gases through the acid. The filling materials should of course be of suitable acid resisting material. Instead of using a liquid body of the aqueous phosphoric acid catalyst, with passage of the gases into intimate contact therewith, the acid may be absorbed on suitable carriers such as pumice stone, silica gel, coke, etc.

The action of the aqueous phosphoric acid catalyst can be promoted by the addition thereto of certain promoters, or of certain substances which form or become promoters during the carrying out of this process. Silver or silver sulfate may be added in small amount as such a promoter, and the use of such a promoter enables the process to be carried out at somewhat lower temperatures, or with somewhat increased yields, than when promoters are not present. Lithium sulfate may also be added with beneficial results.

The apparatus employed in carrying out the process includes a converter or converter chamber containing the acid catalyst and provided with means such as a filling material distributed throughout the acid, for bringing the mixture of ethylene and steam into intimate contact therewith while maintaining the catalyst and the gases under the necessary pressure and at the necessary high temperature, together with means for supplying the steam and ethylene in suitable proportions and under the necessary high pressure, and a condenser for condensing the alcohol and admixed steam from the escaping gases. That part of the apparatus which comes in contact with the acid catalyst should of course be made of suitable acid resistant material, resistant to the action of the acid catalyst at the high temperatures employed.

Where the process is carried out in a cyclic manner the condenser as well as the converter is maintained under a high pressure and the unconverted ethylene is recycled, additional ethylene admixed therewith, and steam also admixed therewith so that provision is made for supplying both steam and additional ethylene to the cycle under the necessary high pressure. The condenser for condensing the alcohol or alcohol and ether may be a multi-stage condenser, with the separate sections or condensers maintained at progressively lower temperatures so that, for example, the ethyl alcohol is largely condensed in the first condenser in the form of a solution of alcohol in water, and the ether is largely separated in a subsequent condenser maintained at a lower temperature. Where ether is formed along with alcohol it is not necessary to condense out the ether, particularly where it is formed only in small amounts, but the ether can be recirculated, along with the ethylene, and again passed through the converter, with maintenance of the condenser at a temperature that will condense the alcohol more or less completely without condensing any considerable amount of ether. The recycled ether will be subjected to the action of the catalyst and, by its presence, may retard the further formation of ether, or may itself be hydrolyzed by the steam and catalyst and converted into alcohol.

In general, the stronger aqueous phosphoric acid catalysts will be employed at a lower pressure and temperature and the weaker acid catalyst at a higher temperature and pressure. In general, temperatures between 200 and 300° are advantageous, and pressures between 100 and 1000 or 2000 pounds.

The nature of the invention will be further illustrated by the following specific examples, but it will be understood that the invention is not limited thereto.

An aqueous phosphoric acid catalyst is first prepared by absorbing the phosphoric acid on small pieces of coke using, for example, about 10% of syrupy phosphoric acid based on the weight of the coke, so that the coke acts as a carrier and the aqueous phosphoric acid is absorbed thereby. The phosphoric acid used initially in making the catalyst need not be that corresponding to the strength or water content of the acid subsequently used in the process, since the strength of the acid will adjust itself, during the carrying out of the continuous process, until it is in equilibrium at the temperature, pressure and ratio of steam to ethylene employed, after which it will maintain approximately a constant strength so long as the conditions of temperature, pressure and ratio of steam to ethylene remain approximately constant.

A mixture of steam and ethylene, in regulated and approximately uniform proportions, is passed over such catalyst, above described, for example, at a pressure of about 200 pounds gauge, and at a temperature of the acid catalyst of between 200 and 300° C. Ratios of steam to ethylene as low as one part of steam to seven parts of ethylene can be used, but higher proportions are more advantageous, for example, three parts of steam to seven parts of ethylene, or even higher proportions, for example, around equal proportions of steam and ethylene, or higher ratios. Lower temperatures, around 200 or 225° C., are less advantageous than higher temperatures, such as 250° C. or 275° C., or 300° C., and the higher temperatures will in general be used with higher ratios of steam to ethylene. If the temperature remains constant, for example, at 250° C. or 300° C., the aqueous phosphoric acid catalyst will contain a larger proportion of water, that is, it will be a more dilute acid catalyst, with higher ratios of steam to ethylene than with lower ratios at any given pressure.

Instead of using the aqueous phosphoric acid absorbed on a carrier, as in the above example, the phosphoric acid can be used in a liquid state, for example, at 230° C., or 250° C., or 275° C., or at 300° C., and at pressures of, for example, 200 pounds per square inch, or 500 pounds per square inch, or higher pressures. The ratio of steam to ethylene may be as low as one part of steam to four parts of ethylene by volume, or one volume of steam to two volumes of ethylene, or higher ratios of steam to ethylene can be used, such as equal proportions of steam and ethylene, or considerably higher ratios. The strength of the phosphoric acid will vary with and is dependent upon the temperature, pressure and ratio of steam to ethylene. In general, with the higher ratios of steam to ethylene, higher temperatures can be used, and the strength of the aqueous phosphoric acid will be less than that of phosphoric acid at atmospheric pressure at the same temperature.

Instead of using phosphoric acid itself in a liquid state or supported on a carrier, it can also be advantageously used with the addition of a promoter, as previously mentioned. Silver sulfate, for example, can be added to the phosphoric acid catalyst in varying amounts, for example, in amount equal to around 6% by weight of the phosphoric acid, figured as 85% phosphoric acid. When such a promoter as silver sulfate is dissolved in the phosphoric acid it will react therewith to form silver phosphate and sulfuric acid, and it is probable that the sulfuric acid and silver phosphate, as well as any unchanged silver sulfate, all act as promoters in the process.

Such a phosphoric acid catalyst, with added promoter, can be used, for example, at a pressure of 200 pounds, or at higher pressures of around 600 or 1000 pounds, and at temperatures, for example, of around 250° C. or 300° C., and with varying ratios of steam to ethylene, varying from somewhat less than one volume of steam to two volumes of ethylene up to equal volumes or even higher ratios of steam to ethylene.

In carrying out the process, using the aqueous phosphoric acid catalyst of the foregoing examples, the mixture of steam and ethylene can be prepared in any suitable manner, for example, as previously described. The mixture of gases is forced under regulated pressure in intimate contact with the phosphoric acid catalyst which is maintained at an effective catalytic temperature, and the resulting gaseous mixture, containing the excess of ethylene and steam, together with the ethyl alcohol vapors, and any vapors of ether, if formed, is then passed to a condenser where the alcohol is condensed as aqueous alcohol, advantageously under the same pressure maintained in the system, and with recirculation of the unconverted eythlene in a manner previously described.

It is one advantage of the present process, when a sufficiently high ratio of steam to ethylene is used, together with an aqueous phosphoric acid catalyst of proper strength maintained at suitably high temperatures and pressures, that it is possible to produce ethyl alcohol without any appreciable production of ethyl ether. With lower ratios of steam to ethylene, and with higher acid strengths, more or less ethyl ether may also be formed along with the ethyl alcohol.

Instead of using phosphoric acid alone as a catalyst, it can advantageously be used in admixture with sulfuric acid as part of a composite catalyst, and either with or without the addition of a promoter such as silver sulfate, etc.

For example, a composite catalyst can be used made up of a mixture of phosphoric acid and sulfuric acid in the proportions of about four parts by weight of phosphoric acid to two parts by weight of sulfuric acid and with the addition of around 3% or somewhat more of silver sulfate, based on the weight of the acid. Such a catalyst can be used, for example, at a pressure of around 200 pounds gauge and at temperatures of the catalyst of around 175 to 225° C. or higher and with varying ratios of steam to ethylene, varying from somewhat less than equal proportions of steam to ethylene to higher ratios.

Such composite catalysts, containing both phosphoric and sulfuric acid, can be similarly used without the addition of a promoter, using, for example, a composite acid catalyst containing about 35% sulfuric acid, about 30% phosphoric acid and about 35% water, with approximately equal proportions of steam and ethylene, at pressures of around 200 pounds or 600 pounds or higher, and with temperatures of around 220° C., or 240° C., or higher temperatures up to 300° C. The strength of the acid above mentioned, that is, the percentage of water which it will contain, will vary with the ratio of steam and ethylene and with the temperature and pressure, but with a constant ratio and with constant temperature and pressure the acid strength will adjust itself until it is in equilibrium and will then remain practically constant so long as the other conditions are maintained constant.

Instead of using approximately equal proportions of phosphoric acid and sulfuric acid, other ratios can be used, for example, ten parts of phosphoric acid to one part of sulfuric, and at temperatures between 200 and 300° C., and pressures of, for example, around 200 pounds or 600 pounds or 1000 pounds or higher; and with varying ratios of steam to ethylene, such as those previously referred to in the preceding examples.

With both phosphoric acid and sulfuric acid employed, either with or without the addition of a promoter, these acids both apparently act, in part at least, through the formation of their ethyl esters, that is, ethyl phosphate and ethyl sulfate, which are probably formed and hydrolyzed and serve as intermediate compounds or catalysts in the continuous carrying out of the process. When phosphoric acid is used alone, in the form of aqueous phosphoric acid, without the presence of sulfuric acid, the intermediate compound is presumably an ethyl phosphate, while with sulfuric acid alone, in the absence of phosphoric acid, the intermediate compound is presumably an ethyl sulfate. With both acids present, both intermediate compounds, or ethyl compounds of both acids, appear to supplement each other in the process.

Whether the phosphoric acid is used alone, or with an added promoter, or with admixed sulfuric acid, and whether in a liquid state or mounted on a carrier, the strength of the aqueous phosphoric acid, whatever it may be initially, will adjust itself to the temperature, pressure and ratio of steam to ethylene, and, once the process has been continued until equilibrium is reached, the strength of the acid will thereafter remain constant or approximately so, and the process can be carried out continuously for long periods of time.

This application is in part a continuation of my prior application, Ser. No. 547,452, filed June 27, 1931.

I claim:

1. The method of producing ethyl alcohol in a continuous manner which comprises passing a mixture of ethylene and water vapor in regulated proportions under a high pressure in excess of about 100 pounds per square inch into intimate contact with an aqueous phosphoric acid catalyst maintained at an effective and substantially uniform catalytic strength and at a temperature between about 170° C. and about 300° C., and cooling the resulting gases to condense the alcohol therefrom.

2. The method of producing ethyl alcohol in a continuous manner which comprises passing a mixture of ethylene and water vapor in regulated proportions under a high pressure in excess of about 100 pounds per square inch into intimate contact with an aqueous phosphoric acid catalyst maintained at an effective and substantially uniform catalytic strength and at a temperature between about 250° C. and about 300° C., and cooling the resulting gases to condense the alcohol therefrom.

3. The method of producing ethyl alcohol in a continuous manner which comprises passing a mixture of ethylene and water vapor in regulated proportions under a high pressure in excess of about 100 pounds per square inch into intimate contact with an aqueous phosphoric acid catalyst containing a promoter, said catalyst being maintained at an effective and substantially uniform catalytic strength and temperature within the range of about 200° C. to 300° C., and cooling the resulting gases to condense the alcohol therefrom.

4. The method of producing ethyl alcohol in a continuous manner which comprises passing a mixture of ethylene and water vapor in uniform and regulated proportions into intimate contact with a phosphoric acid catalyst mounted on and carried by a suitable support and maintained at an effective and substantially uniform catalytic strength and at a temperature between about 170° C. and about 300° C. and a pressure between about 100 pounds and 2000 pounds, and cooling the resulting gases to condense the alcohol therefrom.

5. The method of producing ethyl alcohol in a continuous manner which comprises passing a mixture of ethylene and water vapor in uniform and regulated proportions into intimate contact with a body of liquid phosphoric acid maintained at an effective and substantially uniform catalytic strength and at a temperature between about 170° C. and about 300° C. and at a pressure between about 100 pounds and 2000 pounds and cooling the resulting gases to condense the alcohol therefrom.

6. The method of producing ethyl alcohol in a continuous manner which comprises passing a mixture of ethylene and water vapor in uniform and regulated proportions into intimate contact with a composite catalyst containing phosphoric acid and sulfuric acid maintained at an effective and substantially uniform catalytic strength and at a temperature between about 170° C. and about 300° C. and at a pressure between about 100 pounds and 2000 pounds and cooling the resulting gases to condense the alcohol therefrom.

7. The method of producing ethyl alcohol in a continuous manner which comprises passing a mixture of ethylene and water vapor in regulated proportions under a high pressure in excess of about 100 pounds per square inch into intimate contact with an aqueous phosphoric acid catalyst maintained at an effective and substantially uniform catalytic strength and at a temperature between about 170° C. and about 300° C.

8. The method of producing ethyl alcohol in a continuous manner which comprises passing a mixture of ethylene and water vapor in regulated proportions under a high pressure in excess of about 100 pounds per square inch into intimate contact with an aqueous phosphoric acid catalyst maintained at an effective and substantially uniform catalytic strength and at a temperature between about 250° C. and about 300° C.

9. The method of producing ethyl alcohol in a continuous manner which comprises passing a mixture of ethylene and water vapor in uniform and regulated proportions into intimate contact with a phosphoric acid catalyst mounted on and carried by a suitable support and maintained at an effective and substantially uniform catalytic strength and at a temperature between about 170° C. and about 300° C. and a pressure between about 100 pounds and 2000 pounds.

10. The method of producing ethyl alcohol in a continuous manner which comprises passing a mixture of ethylene and water vapor in uniform and regulated proportions into intimate contact with a body of liquid phosphoric acid maintained at an effective and substantially uniform catalytic strength and at a temperature between about 170° C. and about 300° C. and at a pressure between about 100 pounds and 2000 pounds.

11. The method of producing ethyl alcohol in a continuous manner which comprises passing a mixture of ethylene and water vapor in uniform and regulated proportions into intimate contact with a composite catalyst containing phosphoric acid and sulfuric acid maintained at an effective and substantially uniform catalytic strength and at a temperature between about 170° C. and about 300° C. and at a pressure between about 100 pounds and 2000 pounds.

FLOYD J. METZGER.